United States Patent [19]

Kurihara et al.

[11] Patent Number: 4,825,993
[45] Date of Patent: May 2, 1989

[54] AUTOMATIC TRANSMISSION SYSTEM FOR VEHICLES

[75] Inventors: Kazumasa Kurihara; Kenji Arai, both of Higashimatsuyama, Japan

[73] Assignee: Diesel Kiki Co., Ltd., Japan

[21] Appl. No.: 95,207

[22] Filed: Sep. 11, 1987

[30] Foreign Application Priority Data

Sep. 12, 1986 [JP] Japan .................. 61-213776

[51] Int. Cl.$^4$ .................................. B60K 41/28
[52] U.S. Cl. ....................... 192/0.092; 192/0.052
[58] Field of Search ............. 192/0.092, 0.052, 3.62; 74/856

[56] References Cited

U.S. PATENT DOCUMENTS

| | | | |
|---|---|---|---|
| 4,653,621 | 3/1987 | Oshiage | 192/0.052 X |
| 4,662,494 | 5/1987 | Wakiya et al. | 192/0.092 X |
| 4,680,712 | 7/1987 | Sakakiyama et al. | 192/0.052 X |
| 4,691,285 | 9/1987 | Takeda | 364/424.1 |
| 4,714,145 | 12/1987 | Kurihara et al. | |

FOREIGN PATENT DOCUMENTS 60-11756 1/1985 Japan .
60-75735 4/1985 Japan .

Primary Examiner—David A. Scherbel
Assistant Examiner—Creighton Smith
Attorney, Agent, or Firm—Pollock, Vande Sande & Priddy

[57] ABSTRACT

An automatic transmission system having a gear transmission comprises a detector responsive to the operation of switching OFF an ignition switch for detecting whether or not the actual gear position of the gear transmission matches the position set by a selector. When the result of the detection is that the actual gear position does not match the set gear position, the gear position of the gear transmission is changed to the right position corresponding to the position of the selector at the time the ignition switch is turned off. Thus, the gear transmission is sure to be in the right gear position whenever the ignition switch has been switched OFF.

5 Claims, 2 Drawing Sheets

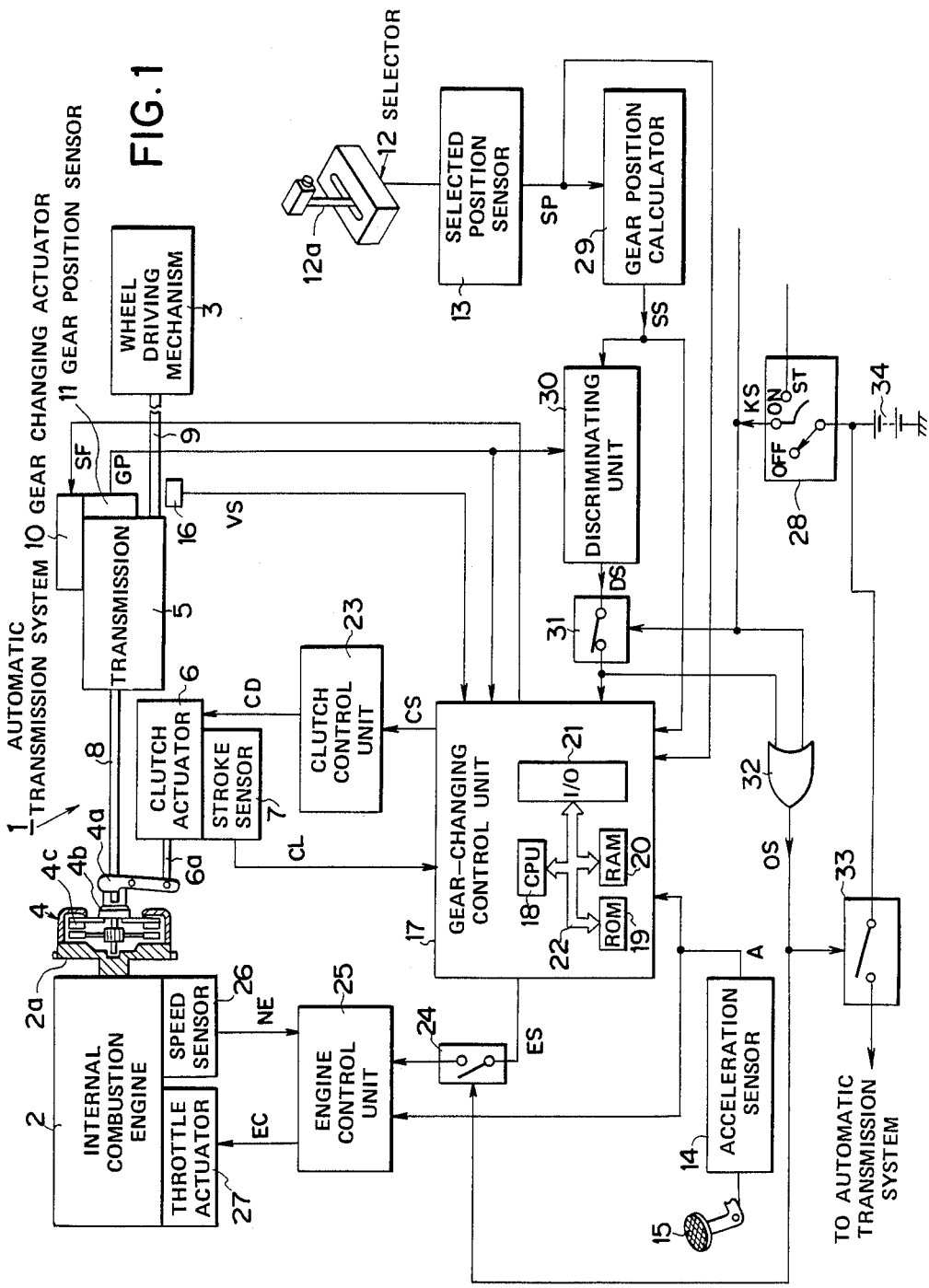

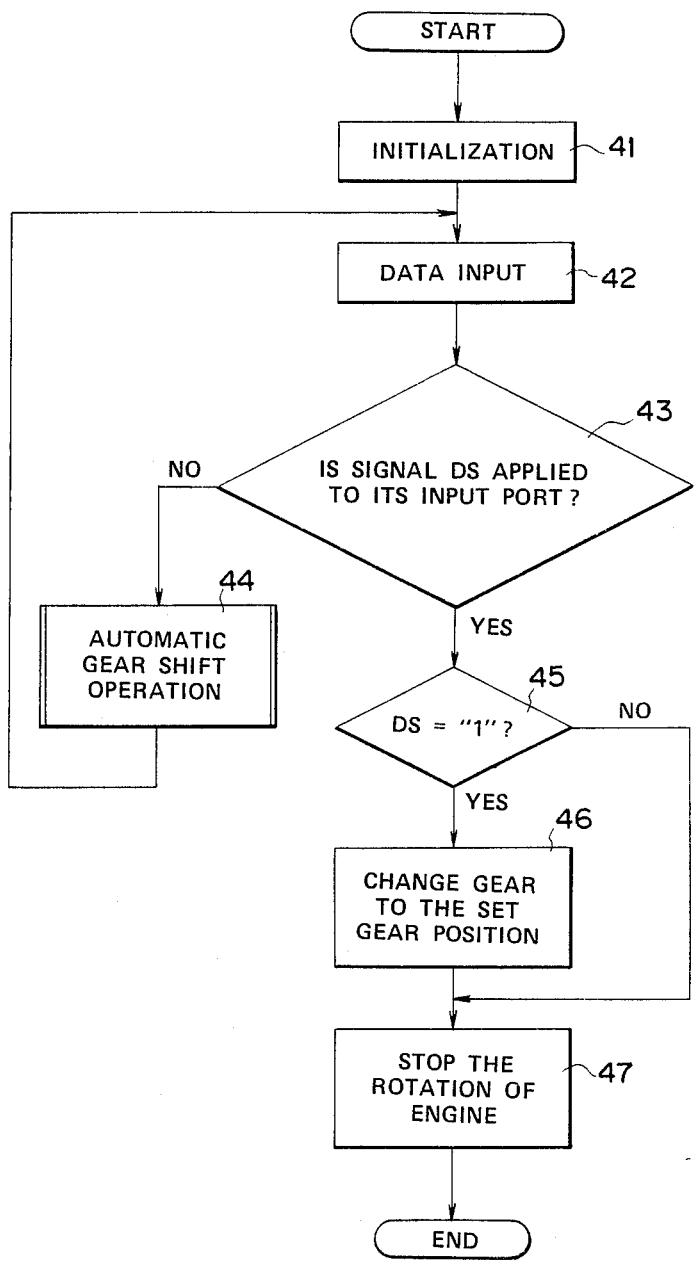

AUTOMATIC TRANSMISSION SYSTEM FOR VEHICLES

BACKGROUND OF THE INVENTION

The present invention relates to an automatic transmission system for vehicles, which comprises a clutch and a gear-type transmission.

In the prior art automatic transmission system including a clutch and a gear transmission, if at the time the vehicles is stopped the selector is in, for example, the "D" position, the transmission is shifted to the first gear position, while the mechanical clutch, (which may be a dry-type single-disc friction clutch, for example), is put in the disengaged state, and the disengaged state of the mechanical clutch is maintained until the accelerator pedal is depressed for vehicle starting. As a result, in this case, the clutch release bearing continues to rotate at the same speed as the engine so long as the vehicle remains stopped, remarkedly shortening the service life of the clutch release bearing.

To eliminate this disadvantage, there has been proposed an automatic transmission control system in which the transmission is shifted to its neutral position and the condition of the clutch is returned to the engaged state regardless of the position of the selector when the clutch has remained in the disengaged state for more than a predetermined time. However, in this proposed system, if the ignition switch is turned off in the case where the selector is in a position other than the "N" but the transmission has been shifted to neutral and the clutch has been engaged in order to prevent the clutch release bearing from wearing, the actual gear position and the selected position of the selector will no longer match. This disadvantageous state may also occur if the ignition switch is turned off before the transmission has been shifted to the set position during he gear shift operation. The state where the actual gear position does not match with the selected position of the selector may be dangerous, especially when the driver parks the vehicle with the gear in a position other than neutral on the assumption that the selected gear position is the actual gear position.

SUMMARY OF THE INVENTION

It is an object of the present invention to provide an improved automatic transmission system for vehicles, which comprises a clutch and a gear type transmission.

It is another object of the present invention to provide an automatic transmission system for vehicles, which is capable of automatically correcting mismatch between the actual gear position and the selected position of the selector.

According to the present invention, in an automatic transmission system for vehicles powered by an internal combustion engine whose rotational output is transmitted through a clutch to a gear transmission, in which the transmission is automatically shifted to a suitable gear position depending upon conditions of operation of the vehicle, the system comprises a selecting means for selecting a gear shift control mode of the gear transmission, means coupled with the selecting means for producing a select signal indicative of the gear shift control mode selected by the selecting means, means responsive to the select signal for producing a set signal indicative of a set gear position to which the gear of the transmission should be shifted when an ignition switch is OFF, a sensor means for producing a position signal indicating the actual position of the gear of the transmission, means responsive to the set signal, the position signal and a signal indicating the ON/OFF condition of the ignition switch for producing a discrimination signal showing whether or not the actual gear position matches the set gear position when the ignition switch has been switched OFF, a first actuating means associated with the transmission for actuating the operation for shifting the gear position of the transmission, a second actuating means associated with the clutch for actuating the engaging/disengaging operation of the clutch, and a controlling means responsive to at least the discrimination and set signals for controlling the first and second actuating means in order to shift the gear position of the transmission to that shown by the set signal when the discrimination signal indicated that the actual gear position does not match the set gear position.

For example, assume that the selecting lever of the selecting means is set at a position other than the "N" and that, after the vehicle remains stopped for a more than predetermined time, the transmission is automatically shifted to neutral and the clutch is also automatically shifted to neutral and the clutch is also automatically engaged to prevent the clutch release bearing from wearing. In this case, when the ignition switch is turned OFF, the actual gear position will come not to match the set gear position shown by the set signal. This condition may also occur when the ignition switch is switched OFF in the course of the gear shift operation.

In the present invention, however, when for some such reason the discrimination signal indicates that the actual gear position does not match the set gear position after the ignition switch has been switched OFF, the transmission is automatically shifted to the set gear position.

Accordingly, if the ignition switch is switched OFF with the selector set at, for example the, "1" position or the "R" position, since the actual gear position of the vehicle following parking will be maintained at the set position, the vehicle can be safely parked even on a slope.

The above and other objects, features and advantages of the present invention will become more apparent from the following description when taken in conjunction with the accompanying drawings.

BRIEF DESCRIPTION OF THE DRAWINGS

FIG. 1 is a block diagram showing an embodiment of an automatic transmission system according to the present invention, and showing a clutch in cross section; and FIG. 2 is a flowchart showing a control program executed in a gear-changing control unit shown in FIG. 1.

DESCRIPTION OF THE PREFERRED EMBODIMENT

FIG. 1 is a block diagram showing an embodiment of an automatic transmission system for vehicles according to the present invention. A vehicle (not shown) powered by an internal combustion engine 2 is equipped with an automatic transmission system 1 which comprises a friction clutch 4 mounted on an engine flywheel 2a and a gear type synchromesh transmission 5. In this embodiment, the friction clutch 4 is a well-known dry-type single-disc clutch having a clutch release lever 4a and a clutch release bearing 4b. In order to control the engaging/disengaging operation of the clutch 4, there is provided a clutch actuator 6 having a piston rod 6a connected to the clutch release lever 4a for actuating the clutch release lever 4a. The clutch actuator 6 is provided with a stroke sensor 7 for detecting the position of a clutch disc 4c of the clutch 4 and a clutch signal CL indicating the position of the clutch disc 4c is produced by the stroke sensor 7. The clutch 4 is connected by a connecting rod 8 with the transmission 5, the rotational output of the transmission 5 is transmitted through a propeller shaft 9 to a wheel driving mechanism 3 of the vehicle.

The gear-type transmission 5 is actuated by a gear changing actuator 10 associated therewith, and the gear position set in the transmission 5 is detected by a gear position sensor 11 associated with the transmission 5 to produce a gear position signal GP showing the actual gear position set in the gear transmission 5.

The vehicle has a selector 12 with a selecting lever 12a that is manipulated by the driver to select one position from among a plurality of positions which may include, e.g., an "N" position (neutral), a "1" position (1st gear), a "2" position (2nd gear), a "D" position (automatic gear changing position), and an "R" position (reverse gear). That is, the driver manipulates the selecting lever 12a in order to select a desired control mode of the transmission 5. The selecting lever 12a is coupled with a selected position sensor 13 for producing a selected position signal SP showing the position of the selecting lever 12a.

An acceleration sensor 14 is associated with an accelerator pedal 15 and produces an acceleration signal A showing the amount of operation of the accelerator pedal 15. Reference numeral 16 indicates a known vehicle speed sensor mounted on the propeller shaft 9 for producing a vehicle speed signal VS showing the running speed of the vehicle powered by the engine 2.

The clutch signal CL, the gear position signal GP, the selected position signal SP, the acceleration signal A and the vehicle speed signal VS, which represent operating parameters of the vehicle, are applied to a gear-changing control unit 17 including a central processing unit (CPU) 18, read-only memory (ROM) 19, random access memory (RAM) 20 and I/O interface 21, which are interconnected by a bus 22. The input signals CL, GP, SP, A and VS are converted into digital form in the I/O interface 21 and are processed in accordance with a control program (which will be described later) stored in advance in the ROM 19 to produce a shift control signal SF, a clutch control signal CS and an engine control signal ES, which serve to shift the transmission 5 into the gear position determined by the computation carried out in the CPU 18.

The shift control signal SF is applied to the gear changing actuator 10 for controlling the gear changing actuator 10 so as to shift the transmission 5 into the determined gear position, while the clutch control signal CS is applied to a clutch control unit 23 for producing a clutch driving signal CD in response to the clutch control signal CS for commanding the engagement or disengagement of the clutch 4. The clutch driving signal CD drives the clutch actuator 6 so as to gradually engage or disengage the clutch 4.

The level of the engine control signal ES becomes high when the clutch control signal CS indicates the command for disengaging the clutch 4, and the engine control signal ES is supplied through a normally open switch 24 to an engine control unit 25 when also receives the acceleration signal A and an engine speed signal NE output by a known speed sensor 26 and indicating the rotational speed of the engine 2.

The engine control unit 25 functions to regulate the engine speed based on the manipulation of the accelerator pedal 15. Namely, the engine control unit 25 is responsive to the acceleration signal A to produce an engine speed control signal EC, which is applied to a throttle actuator 27 for controlling the fuel supply to the engine 2. Thus, the throttle actuator 27 is actuated by the engine speed control signal EC in accordance with the amount of operation of the accelerator pedal 15 and the engine speed can be regulated in accordance with the manipulation of the accelerator pedal 15. The above-described operation is performed in the engine control unit 25 only when a high level engine control signal ES is not applied to the engine control unit 25.

When a high level engine control signal ES is applied through the switch 24 to the engine control unit 25, the engine control unit 25 functions to maintain the engine speed at its idling speed in response to the engine speed signal NE. As will be described later in more detail, the high level engine control signal ES is supplied to the engine control unit 25 when the clutch 4 is in the disengaged state during the gear change operation, whereby it is possible to suppress increase in engine speed while the clutch is disengaged for changing the gears.

Thus, the gear-changing control unit 17 functions to automatically shift the transmission 5 into the target gear position in accordance with position of the shifting lever 12a. In addition to the above mentioned basic function for automatically shifting the transmission 5, the gear-changing control unit 17 carries out an additional function of shifting the transmission 5 into its neutral position and engaging the clutch 4 when the vehicle remains stopped for more than a predetermined time period with the gear position of the transmission at a place other than neutral and the clutch 4 maintained in disengaged state. Wear of the clutch release bearing 4b is thus reduced.

As described above, the additional function of the gear-changing control unit 17 sometimes causes the actual gear position to be different from the target gear position, depending upon the position of the selecting lever 12a. The same disadvantage as arises from the additional function will occur in the case where the ignition switch 28 is turned off in the course of the gear shift operation of the system.

To eliminate such disadvantages, the automatic transmission system 1 has a still further function for automatically shifting the transmission 5 to the right gear position when the ignition switch 28 is switched OFF. An explanation will now be given on the arrangement for performing this function.

The selected position signal SP is applied to a gear position calculator 29, in which a set gear position corresponding to the selected position indicated by the selected position signal SP at that time is determined. The set gear position is the gear position to which the transmission 5 should be shifted at the time the ignition switch 28 is switched OFF. The set gear position for the "N" position is neutral, the set gear position for the "2nd" position is second gear, the set gear position for the "D" position is first gear, and the set gear position for the "R" position is reverse gear. The calculation for determining the set gear position may be carried out by the use of map data showing the relationship indicated above. A signal indicating the result calculated by the gear position calculator 29 is produced therefrom as a set signal SS, which is applied to a discriminating unit 30, which also receives the gear position signal GP.

The discriminating unit 30 functions to compare the set signal SS with the gear position signal GP to determine whether or not the actual gear position shown by the gear position signal GP is the same as the set gear position shown by the set signal SS. the discriminating unit 30 produces a discrimination signal DS whose level becomes high only when the actual gear position is not the same as the set gear position shown by the set signal SS, and the discrimination signal DS is supplied through a normally closed switch 31 to the gear-changing control unit 17. The ON/OFF state of the switch 31 is controlled by a key signal KS whose level becomes high only when the ignition switch 28 is at its ON position or ST position. Accordingly, the switch 31 is closed to allow the discrimination signal DS to be applied to the gear-changing control unit 17 only when the ignition switch 28 is OFF.

The output signal from the switch 31 and the key signal KS are applied to the respective input terminals of a two input OR gate 32 and the output signal OS from the OR gate 32 is applied as a switch control signal to the switch 24 and a switch 33 for controlling the supply of electric power to the automatic transmission system 1 from a battery 34. Both switches 24 and 33 are closed when the level of the output signal OS is high and opened when the level of the output signal OS is low. Accordingly, both switches 24 and 33 are sure to close when the ignition switch 28 is switched to its ON or ST state or when the level of the discrimination signal DS is high in the case where the ignition switch 28 is switched OFF to allow the switch 31 to close.

FIG. 2 is a flowchart showing the control program executed in the CPU 18 of the gear-changing control unit 17. The execution of the program starts when the switch 33 is closed to allow the system to be energized, and at first, initialization is executed in step 41. After the initialization, the operation moves to step 42 in which a data input operation is carried out by reading the input signals CL, GP, SP, A, VS, SS and DS which are applied to respective input ports of the I/O interface 21. Then, the operation moves to step 43 wherein a discrimination is made as to whether or not a high level signal is present on the input port of the I/O interface 21 to which the discrimination signal DS is to be applied. Since no signal is applied to this input port when the ignition switch 28 is not in its OFF state, the discrimination in step 43 becomes NO and the procedure advances to step 44 wherein automatic gear shift operation or gear-changing operation is carried out. In this case, the automatic gear shift operation includes both the gear-changing operation according to the basic function and that according to the additional function of the gear-changing control unit 17, which are fully described in the foregoing. As the gear-changing operation according to the basic and additional functions is known in the prior art, a detailed flowchart for step 44 is not given here. For example, the gear change operation according to the additional function is disclosed in Japanese Patent Application Public Disclosure No. Sho 60-252855. The discrimination in step 43 becomes YES when the switch 31 is closed owing to the ignition switch 28 being OFF, and the operation moves to step 45 wherein a discrimination is made as to whether or not the level of the discrimination signal DS is high. The discrimination in step 45 is YES when DS="1", and the operation moves to step 46 wherein the transmission 5 is shifted into the set gear position indicated by the set signal SS. After this, the operation moves to step 47 wherein the rotation of the engine 2 is stopped by the engine control signal ES commanding the engine speed to reduce to zero.

When the discrimination in step 45 is NO because the discrimination signal DS is at low level, the operation moves to step 47 without the execution of step 46, and then the execution of this program is terminated.

With the automatic transmission system constituted as described above, the transmission 5 is automatically shifted to an optimum or target gear position calculated in the gear-changing control unit 17 in response to the position of the selecting lever 12a in accordance with the basic function thereof in the case where the vehicle is running normally. On the other hand, when the vehicle remains stopped for more than a predetermined period in the case where the selecting lever 12a is positioned at a position other than "N", in order to prevent the clutch release bearing from wearing excessively, the transmission 5 is automatically shifted to the neutral position and the clutch 4 is engaged. This operation is performed by the additional function of the gear-changing control unit 17. In this case, the discrimination signal DS is not applied to the gear-changing control unit 17 since the switch 31 is opened owing to the ignition switch 28 being ON.

In the case where the driver intends to restart the vehicle, if after positioning the selecting lever 12a to the "N" position he then returns it to the original position, the vehicle will start upon the depression of the accelerator pedal. In contrast, in the case where the ignition switch 28 is switched OFF to stop the engine, the switch 31 is closed because this switching operation of the ignition switch 28 causes the level of the key signal KS to be low. This allows the discrimination signal DS to be applied to the gear-changing control unit 17. If the level of the discrimination signal DS is high, the transmission 5 is shifted to the gear position indicated by the set signal SS by the control operation of the gear-changing control unit 17, while the engine control signal ES is applied to the engine control unit 25 because of the high level of the output signal OS, whereby the engine is maintained at its idling speed during the gear shift operation. At the same time, since the switch 33 is maintained closed due to the high level state of the output signal OS regardless of the OFF state of the ignition switch 28, electric power from the battery 34 is supplied to the system 1. When the operation of shiftting to the set gear position is completed, the level of the discrimination signal DS becomes low, causing the switches 24 and 33 to open and interrupting the power supply to the system 1. If the level of the discrimination signal DS is low when the ignition switch 28 is switched OFF, the power supply from the battery 34 to the system 1 is cut off immediately by opening the switch 33 because the level of the output signal OS becomes low at this time.

As described above, if at the time the ignition switch 28 is switched OFF, the actual gear position is for some reason not the same as the set gear position indicated by the set signal SS, the gear-changing control unit 17 operates to shift the transmission 5 to the set gear position in response to the high level state of the discrimination signal DS and the power supply is stopped after this gear shifting operation is completed.

Accordingly, the vehicle can be reliably parked in a gear position other than neutral. Furthermore, since the actual gear is sure to be the right one, no problem arises when restarting the vehicle.

We claim:

1. An automatic transmission system for vehicles powered by an internal combustion engine whose rotational output is transmitted through a clutch to a gear transmission, in which the transmission is automatically shifted to a suitable gear position depending upon the conditions of operation of the vehicle, comprising:

a selecting means for selecting a gear shift control mode of said gear transmission;

means coupled with said selecting means for producing a selected mode signal indicative of the gear shift control mode selected by said selecting means;

means responsive to said selected mode position signal for producing a set signal indicative cf a set gear position to which the gear of the transmission should be shifted when an ignition switch is OFF;

a sensor means for producing a position signal indicating an actual position of the gear of said gear transmission;

a first means responsive to said set signal, said position signal and an ignition switch signal indicating the ON/OFF condition of the ignition switch for producing a discrimination signal showing whether or not the actual gear position matches the set gear position when the ignition switch has been switched OFF;

a first actuating means associated with said gear transmission for actuating the operation for shifting the gear position of said gear transmission;

a second actuating means associated with said clutch for actuating the engaging/disengaging operation of said clutch; and a second means responsive to at least said discrimination signal and said set signal for controlling said first and second actuating means in order to shift the gear position of said gear transmission to that shown by said set signal when said discrimination signal indicates that the actual gear position does not match the set gear position.

2. The system as claimed in claim 1 wherein said first means has a circuit means for discriminating whether or not the actual gear position matches the set gear position and producing the discrimination signal based on the result of the discrimination and a switch means responsive to said ignition switch signal for controlling the passage of the discrimination signal, whereby the discrimination signal is output only when the ignition switch is OFF.

3. The system as claimed in claim 1 further comprising a power switch for ON/OFF switching a power supply and a power switch control means responsive to said discrimination signal and said ignition switch signal for controlling said power switch so as to open when said ignition switch is OFF and the actual gear position matches the set gear position.

4. The system as claimed in claim 1 wherein said system further comprises an engine control means and the speed of said engine is kept at idling speed during the disengaged state of said clutch owing to the gear shift operation in accordance with the control by said second means.

5. The system as claimed in claim 4 wherein said engine control means is responsive to an acceleration signal indicating the amount of operation of an accelerator means and controls the speed of said engine in accordance with the amount of operation except during the period when said clutch is in disengaged state owing to the gear shift operation.

* * * * *